United States Patent
Li et al.

(10) Patent No.: US 10,470,261 B2
(45) Date of Patent: Nov. 5, 2019

(54) METHOD OF GENERATING STABLE DIRECT CURRENT SIGNAL, SILICON CONTROLLED SWITCH DIMMING METHOD AND DEVICE

(71) Applicant: SHENZHEN SUNMOON MICROELECTRONICS CO., LTD., Shenzhen, Guangdong (CN)

(72) Inventors: Zhaohua Li, Guangdong (CN); Daoming Lin, Guangdong (CN); Laichang Huang, Guangdong (CN); Qiao Hu, Guangdong (CN)

(73) Assignee: SHENZHEN SUNMOON MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 16/321,033

(22) PCT Filed: Jan. 10, 2017

(86) PCT No.: PCT/CN2017/070702
§ 371 (c)(1),
(2) Date: Jan. 27, 2019

(87) PCT Pub. No.: WO2018/023953
PCT Pub. Date: Feb. 8, 2018

(65) Prior Publication Data
US 2019/0166666 A1 May 30, 2019

(30) Foreign Application Priority Data
Aug. 5, 2016 (CN) .......................... 2016 1 0638831

(51) Int. Cl.
*H05B 41/36* (2006.01)
*H05B 33/08* (2006.01)
(Continued)

(52) U.S. Cl.
CPC ........ *H05B 33/0815* (2013.01); *H02M 7/155* (2013.01); *H05B 33/0824* (2013.01); *H05B 33/0845* (2013.01); *H05B 41/3924* (2013.01)

(58) Field of Classification Search
CPC ............ H05B 33/0815; H05B 33/0845; H05B 41/3924
(Continued)

(56) References Cited

U.S. PATENT DOCUMENTS

2012/0256553 A1* 10/2012 Chen .................. H05B 33/0845
315/205
2015/0146461 A1* 5/2015 Deng .................. H02M 7/1557
363/85
2015/0264756 A1* 9/2015 Xu ..................... H05B 33/0857
315/192

FOREIGN PATENT DOCUMENTS

CN 102099621 A 6/2011
CN 102665324 A 9/2012
(Continued)

OTHER PUBLICATIONS

International Search Report of PCT Patent Application No. PCT/CN2017/070702 dated May 9, 2017.

*Primary Examiner* — Thuy V Tran

(57) ABSTRACT

A method for generating a stable direct current signal, a silicon controlled switch dimming method and device, the silicon controlled switch dimming method comprising: adjusting a phase angle of a silicon controlled switch and outputting an alternating current signal related to the phase angle of the silicon controlled switch (S101); rectifying the alternating current signal (S102); converting the rectified electric signal into a steady direct current signal one-to-one corresponding to the phase angle of the silicon controlled switch, and the stable direct current signal decreases as the phase angle of a silicon controlled switch increases (S103);
(Continued)

controlling turning on or off of an output current regulating circuit according to the magnitude of the stable direct current signal so as to control the plurality of serially connected LED lamp groups to be turned all on or all off (S104). The generated stable DC signal one-to-one corresponds to the phase angle of the silicon controlled switch and decreases with the increase of the phase angle of the silicon controlled switch. The stable direct current signal can control work status of the plurality of LED lamp groups connected in series, thereby making the plurality of LED lamp groups connected in series be turned all on or all off.

8 Claims, 6 Drawing Sheets

(51) Int. Cl.
*H02M 7/155* (2006.01)
*H05B 41/392* (2006.01)

(58) Field of Classification Search
USPC ........................................ 315/194, 291, 299
See application file for complete search history.

(56) References Cited

FOREIGN PATENT DOCUMENTS

| | | |
|---|---|---|
| CN | 202759647 U | 2/2013 |
| CN | 103024992 A | 4/2013 |
| CN | 104125680 A | 10/2014 |
| CN | 104578799 A | 4/2015 |
| CN | 105657909 A | 6/2016 |
| CN | 205883663 U | 1/2017 |

\* cited by examiner

METHOD OF GENERATING STABLE DIRECT CURRENT SIGNAL, SILICON CONTROLLED SWITCH DIMMING METHOD AND DEVICE

TECHNICAL FIELD

The present disclosure relates generally to electronic technology fields, and more particularly, to a method of generating stable direct current signal, a dimming method and device of a SCR (silicon controlled rectifier) switch.

BACKGROUND

In recent years, LED lamps have been widely used as lighting power sources instead of the traditional incandescent lamps. LED driving devices are commonly divided into traditional driving devices based on switching power supply, and linear driving devices, in which the linear driving devices are becoming more and more popular with their simple system structure and low costs. At the same time, dimmable LED lighting power applications are also increasingly used. SCR dimming is widely used as a common dimming method. Chinese patent CN202759647U discloses an LED control circuit and an LED lighting device with a high power factor, and recites an LED control circuit formed by a LED constant current driving circuit which is turned on sectionally and step-by step and capable of realizing a high power factor as well as a low harmonic distortion, and an SCR switch for realizing a dimming function. This is a common application on the market with the advantage of the high power factor and low harmonic distortion. However, as the LED lamp is turned on sectionally and step-by step, when the SCR switch has a large phase angle during the SCR dimming, the input voltage is not large enough to turn on all the LED lamps, the LED lamps are partially turned on, so the brightness of which is not uniform enough and the visual effect obtained is poor.

SUMMARY

The object of the present application is to provide a method of generating stable direct current signal, a dimming method of a SCR switch and the corresponding device, capable of controlling the plurality of LED lamp groups connected in series to be turned all on or all off, for avoiding the problem that the brightness of the LED lamps is not uniform enough and increasing the visual effect.

In a first aspect, a method of generating stable direct current signal is provided, comprising following steps:

adjusting a phase angle of a SCR switch and outputting an alternating current signal related to the phase angle of the SCR switch;

rectifying the alternating current signal;

converting rectified alternating current signal into a stable direct current signal one-to-one corresponding to the phase angle of the SCR switch, wherein the stable direct current signal decreases as the phase angle of the SCR switch increases.

In a second aspect, a dimming method of a SCR switch, applicable to a dimming device of a SCR switch comprising an output current adjusting circuit and connected to a plurality of serially connected LED lamp groups, comprising following steps:

adjusting a phase angle of a SCR switch and outputting an alternating current signal related to the phase angle of the SCR switch;

rectifying the alternating current signal;

converting rectified alternating current signal into a stable direct current signal one-to-one corresponding to the phase angle of the SCR switch, wherein the stable direct current signal decreases as the phase angle of the SCR switch increases;

controlling a turning on or off of the output current adjusting circuit according to a magnitude of the stable direct current signal for outputting a current changing with the magnitude of the stable direct current signal by the output current adjusting circuit, thus turning all on or all off the plurality of serially connected LED lamp groups by controlling an output current of the plurality of serially connected LED lamp groups.

In a preferable embodiment of the present application, the output current adjusting circuit comprises an N-channel MOS transistor; and the step of controlling a turning on or off of the output current adjusting circuit according to a magnitude of the stable direct current signal for outputting a current changing with the magnitude of the stable direct current signal by the output current adjusting circuit, thus turning all on or all off the plurality of serially connected LED lamp groups by controlling an output current for the plurality of serially connected LED lamp groups further comprising following steps:

controlling a voltage between a gate and a source of the N-channel MOS transistor to decrease but still be larger than or equal to a turning-on threshold value of the N-channel MOS transistor for turning on the N-channel MOS transistor, when the phase angle of the SCR switch increases but is still smaller than or equal to a threshold value to decrease the stable direct current signal; such that an on-resistance of the N-channel MOS transistor increases and an output current of the N-channel MOS transistor decreases which decreasing an output current and a forward conductive voltage of the plurality of serially connected LED lamp groups, and meanwhile a voltage difference between an input terminal of a first LED lamp group and an output terminal of a last LED lamp group is equal to or larger than a sum of forward conductive voltages of all the LED lamp groups, then the plurality of serially connected LED lamp groups are turned all on with a decreasing brightness;

controlling the voltage between the gate and the source of the N-channel MOS transistor to decrease to be smaller than the turning-on threshold value of the N-channel MOS transistor for turning off the N-channel MOS transistor, when the phase angle of the SCR switch increases to be larger than the threshold value; such that the plurality of serially connected LED lamp groups are turned all off.

In a third aspect, a device of generating stable direct current signal is provided, comprising:

a SCR switch, connected to mains supply, for outputting an alternating current signal related to a phase angle of the SCR switch;

a rectifier circuit, connected to the SCR switch, for rectifying the alternating current signal;

an input voltage sampling and shaping circuit, connected to the rectifier circuit, for converting rectified alternating current signal into a stable direct current signal one-to-one corresponding to the phase angle of the SCR switch, wherein the stable direct current signal decreases as the phase angle of the SCR switch increases.

In a fourth aspect, a dimming device of a SCR switch connected to a plurality of serially connected LED lamp groups is provided, comprising:

a SCR switch, connected to mains supply, for outputting an alternating current signal related to a phase angle of the SCR switch;

a rectifier circuit, connected to the SCR switch, for rectifying the alternating current signal;

an input voltage sampling and shaping circuit, connected to the rectifier circuit, for converting rectified alternating current signal into a stable direct current signal one-to-one corresponding to the phase angle of the SCR switch, wherein the stable direct current signal decreases as the phase angle of the SCR switch increases;

an output current adjusting circuit, connected to the input voltage sampling and shaping circuit, for being turning on or off according to a magnitude of the stable direct current signal for outputting a current changing with the magnitude of the stable direct current signal, thus turning all on or all off the plurality of serially connected LED lamp groups by controlling an output current for the plurality of serially connected LED lamp groups.

In a preferable embodiment of the present application, the dimming device of a SCR switch further comprises:

a multi-level LED constant current driving circuit, connected to the output current adjusting circuit and one-to-one connected to the plurality of LED lamp groups, for driving the plurality of LED lamp groups; wherein a number of the LED constant current driving circuit is same as that of the plurality of LED lamp groups;

a switch driving circuit, connected to an input terminal of a first LED lamp group and an output terminal of the output current adjusting circuit, for generating a holding current of the SCR switch to enable a normal operation of the SCR switch when the plurality of LED lamp groups are turned off.

In a preferable embodiment of the present application, each level of the multi-level LED constant current driving circuit comprises a current input terminal, a reference voltage terminal and a current output terminal; wherein the output current adjusting circuit comprises a switch tube comprising an input terminal, an output terminal and a control terminal; wherein the current input terminal of each level of the multi-level LED constant current driving circuit is one-to-one correspondingly connected to an output terminal of each LED lamp group, and the current output terminals of each level of the multi-level LED constant current driving circuit are connected together to the output terminal of the switch tube; wherein, the control terminal of the switch tube is connected to the input voltage sampling and shaping circuit, and the output terminal of the switch tube is connected to the switch driving circuit.

In a preferable embodiment of the present application, the switch tube is a first N-channel MOS transistor having a drain as the input terminal of the switch tube, a source as the output terminal of the switch tube, and a gate as the control terminal of the switch tube.

In a preferable embodiment of the present application, the input voltage sampling and shaping circuit comprises a resistor R1, a resistor R2 and a capacitor C1; wherein a first terminal of the resistor R1 is connected to a first terminal of the resistor R2, a first terminal of the capacitor C1 and the control terminal of the switch tube; and the second terminal of the resistor R2 and the second terminal of the capacitor C1 are connected to a reference ground.

In a preferable embodiment of the present application, each level of the multi-level LED constant current driving circuit comprises an operational amplifier and an N-channel MOS tube; wherein an non-inverting input terminal of the operational amplifier forms the reference voltage terminal of this level of the multi-level LED constant current driving circuit, an inverting input terminal of the operational amplifier and a source of the N-channel MOS tube of each lever of the multi-level LED constant current driving circuit are connected together to form the current output terminal of this level of the multi-level LED) constant current driving circuit; wherein a drain of the N-channel MOS tube of each lever of the multi-level LED constant current driving circuit forms the current input terminal of this level of the multi-level LED constant current driving circuit; wherein an output terminal of the operational amplifier of each lever of the multi-level LED constant current driving circuit is connected with a gate of the N-channel MOS tube of this level of the multi-level LED constant current driving circuit.

In a preferable embodiment of the present application, the switch driving circuit comprises an operational amplifier, an N-channel MOS tube, a resistor R3, and a resistor R4; wherein an non-inverting input terminal of the operational amplifier forms a reference voltage terminal of the switch driving circuit, an output terminal of the operational amplifier is connected to the gate of the N-channel MOS tube whose drain is connected to an input terminal of a first LED lamp group, an inverting input terminal of the operational amplifier and the source of the N-channel MOS tube are together connected to a first terminal of the resistor R4 whose second terminal is connected to an output terminal of the switch tube and a first terminal of the resistor R3 whose second terminal is connected to the reference ground.

In a preferable embodiment of the present application, a voltage between a gate and a source of the N-channel MOS transistor is controlled to decrease but still be larger than or equal to a turning-on threshold value of the N-channel MOS transistor for turning on the N-channel MOS transistor, when the phase angle of the SCR switch increases but is still smaller than or equal to a threshold value to decrease the stable direct current signal; such that an on-resistance of the N-channel MOS transistor increases and an output current of the N-channel MOS transistor decreases which decreasing an output current and a forward conductive voltage of the plurality of serially connected LED lamp groups, and meanwhile a voltage difference between an input terminal of a first LED lamp group and an output terminal of a last LED lamp group is equal to or larger than a sum of forward conductive voltages of all the LED lamp groups, then the plurality of serially connected LED lamp groups are turned all on with a decreasing brightness;

wherein the voltage between the gate and the source of the N-channel MOS transistor to is controlled to decrease to be smaller than the turning-on threshold value of the N-channel MOS transistor for turning off the N-channel MOS transistor, when the phase angle of the SCR switch increases to be larger than the threshold value; such that the plurality of serially connected LED lamp groups are turned all off.

The present application has provided a method of generating stable direct current signal, a dimming method of a SCR switch and the corresponding device, in which the stable direct current signal of the present application is one-to-one corresponding to the phase angle of the SCR switch and can decrease with the increasing of the phase angle of the SCR switch, in such a way, the working state of plurality of LED lamp groups connected in series can be controlled by the stable direct current signal; thus controlling the plurality of LED lamp groups connected in series to be turned all on or all off, for avoiding the problem that the brightness of the LED lamps is not uniform enough and increasing the visual effect.

DETAILED DESCRIPTION OF THE PREFERRED EMBODIMENT

The structure and operation principle of the present application are further illustrated with reference to the accompanying drawings and embodiments.

Embodiment 1

Figure 1:
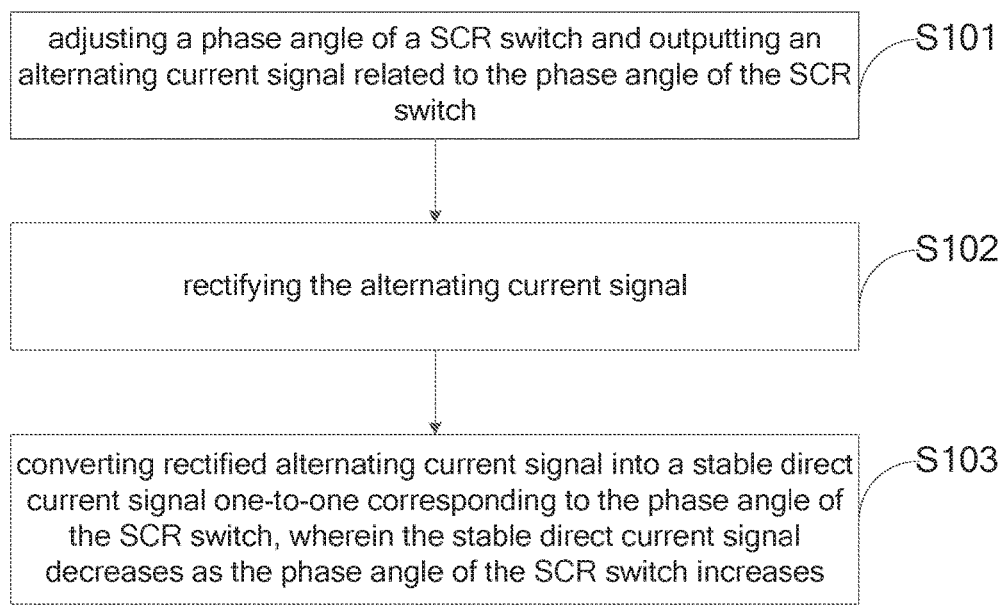
FIG. 1 is a flow chart of a method of generating stable direct current signal according to a first embodiment of the present application.

The present embodiment has provided a method of generating stable direct current signal as shown in FIG. 1, which comprising following steps:

S101. adjusting a phase angle of a SCR switch and outputting an alternating current signal related to the phase angle of the SCR switch;

S102. rectifying the alternating current signal;

S103. converting rectified alternating current signal into a stable direct current signal one-to-one corresponding to the phase angle of the SCR switch, wherein the stable direct current signal decreases as the phase angle of the SCR switch increases.

Figure 2:
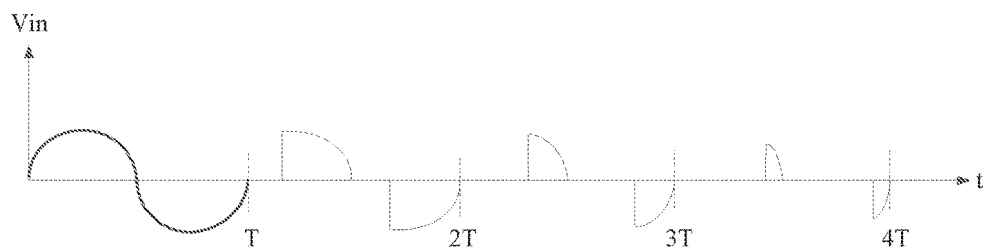
FIG. 2 is a waveform diagram of an alternating current signal outputted by the SCR switch and related to the phase angle of the SCR switch.

FIG. 2 is a waveform diagram of an alternating current signal (Vin) outputted by the SCR switch and related to the phase angle of the SCR switch. As shown, as the time period T increases from the left to the right, the phase angle of the SCR switch increases too. But the phase angle of the SCR switch keeps constant in the same time period T. As shown, when the phase angle of the SCR switch is zero, a complete alternating current signal is outputted. The larger the phase angle of the SCR switch, the more the current signals which are cut off.

Figure 3:
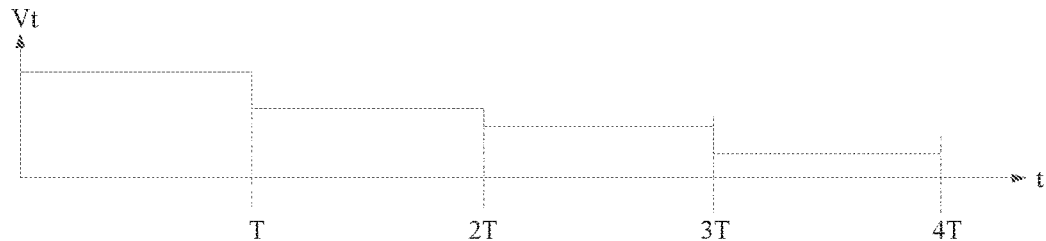
FIG. 3 is a waveform diagram of a stable direct current signal one-to-one corresponding to the phase angle of the SCR switch.

The alternating current signal is rectified by a rectifier bridge to obtain a direct current signal which is a periodic direct current signal that changes with time. Such periodic direct current signal that changes with time is related to the phase angle of the SCR switch and is then converted to a stable direct current signal (Vt) for obtaining a direct current signal which is not related to the time. That is, the value of the stable direct current signal is constant under the condition that the phase angle of the SCR switch does not change, but decrease when the phase angle of the SCR switch increases, as shown in FIG. 3.

The method of generating stable direct current signal of the present embodiment can generate a stable direct current signal which is one-to-one corresponding to the phase angle of the SCR switch and can decrease with the increasing of the phase angle of the SCR switch. Such stable direct current signal can be applied to the SCR dimming field for controlling the plurality of LED lamp groups connected in series to be turned all on or all off, or other fields according to the actual requirements.

Embodiment 2

The present embodiment has provided a dimming method of a SCR switch, which applies the method of generating stable direct current signal according to the first embodiment into the LED dimming technology and supplementing steps and contents on the basis of the first embodiment. For the detail explanation of the present embodiment, reference may be made to the first embodiment.

The dimming method of a SCR switch, is applicable to a dimming device of a SCR switch comprising an output current adjusting circuit and connected to a plurality of serially connected LED lamp groups. Each LED lamp group comprises one LED lamp or a plurality of LED lamps connected in parallel.

Figure 4:
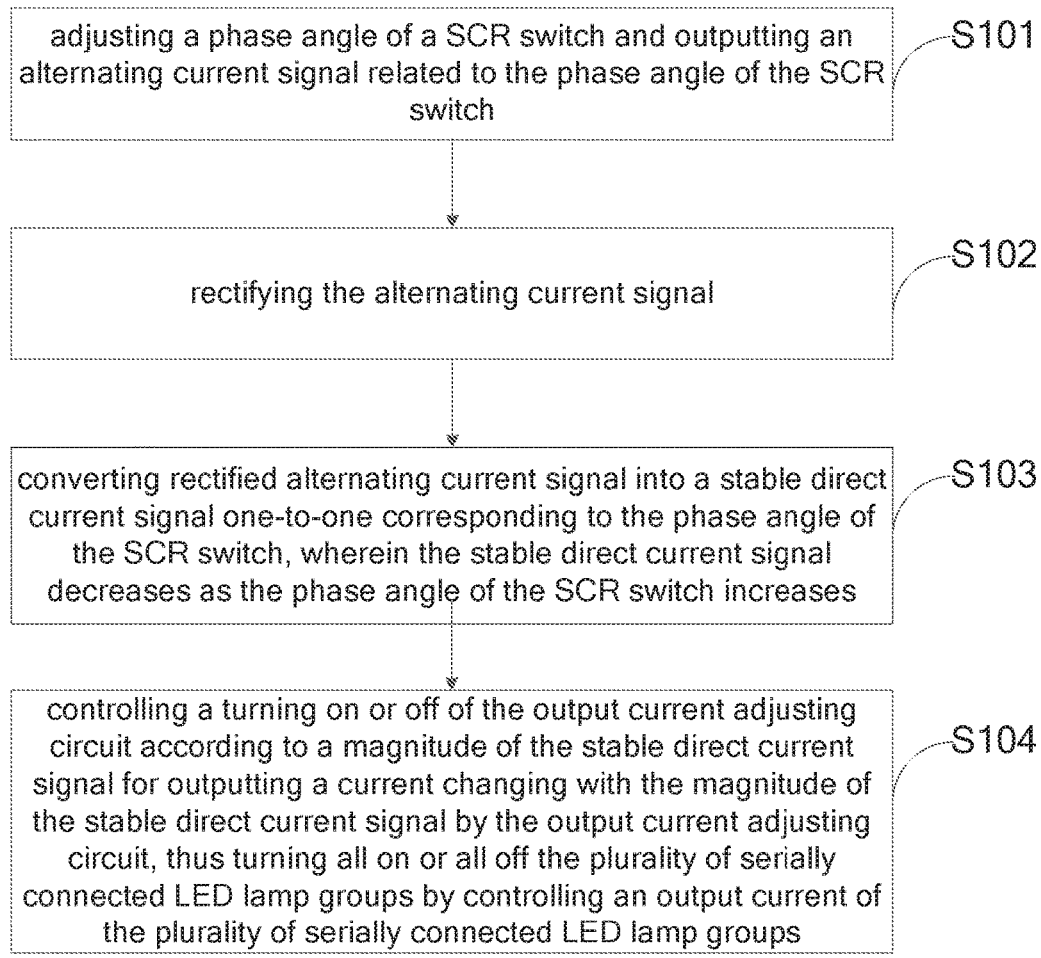
FIG. 4 is a flow chart of a dimming method of a SCR switch according to a second embodiment of the present application.

As shown in FIG. 4, the dimming method of a SCR switch comprises following steps:

S101. adjusting a phase angle of a SCR switch and outputting an alternating current signal related to the phase angle of the SCR switch;

S102. rectifying the alternating current signal;

S103. converting rectified alternating current signal into a stable direct current signal one-to-one corresponding to the phase angle of the SCR switch, wherein the stable direct current signal decreases as the phase angle of the SCR switch increases;

S104. controlling a turning on or off of the output current adjusting circuit according to a magnitude of the stable direct current signal for outputting a current changing with the magnitude of the stable direct current signal by the output current adjusting circuit, thus turning all on or all off the plurality of serially connected LED lamp groups by controlling an output current of the plurality of serially connected LED lamp groups.

It is well known that when the magnitude of the input electrical signal of a circuit changes, the output electrical signal also changes, but in step S104, the equivalent resistance of the output current adjusting circuit changes with the magnitude of the stable direct current signal, thus further affecting the output current of the output current adjusting circuit.

Preferably, the output current adjusting circuit comprises an N-channel MOS transistor; and the step further comprises following steps:

controlling a voltage between a gate and a source of the N-channel MOS transistor to decrease but still be larger than or equal to a turning-on threshold value of the N-channel MOS transistor for turning on the N-channel MOS transistor, when the phase angle of the SCR switch increases but is still smaller than or equal to a threshold value to decrease the stable direct current signal; such that an on-resistance of the N-channel MOS transistor increases and an output current of the N-channel MOS transistor decreases which decreasing an output current and a forward conductive voltage of the plurality of serially connected LED lamp groups, and meanwhile a voltage difference between an input terminal of a first LED lamp group and an output terminal of a last LED lamp group is equal to or larger than a sum of forward conductive voltages of all the LED lamp groups, then the plurality of serially connected LED lamp groups are turned all on with a decreasing brightness;

controlling the voltage between the gate and the source of the N-channel MOS transistor to decrease to be smaller than the turning-on threshold value of the N-channel MOS transistor for turning off the N-channel MOS transistor, when the phase angle of the SCR switch increases to be larger than the threshold value; such that the plurality of serially connected LED lamp groups are turned all off.

The dimming method of a SCR switch of the present embodiment can generate a stable direct current signal which is one-to-one corresponding to the phase angle of the SCR switch. Such stable direct current signal can be applied for controlling the turning on or off of the output current adjusting circuit of the dimming device of a SCR switch, thus controlling the plurality of LED lamp groups connected in series to be turned all on or all off for avoiding the problem that the brightness of the LED lamps is not uniform enough and increasing the visual effect.

Embodiment 3

The present embodiment has provided a device of generating stable direct current signal, which is corresponding to the method of the first embodiment of the present application. For the detail explanation of the present embodiment, reference may be made to the first embodiment.

Figure 5:
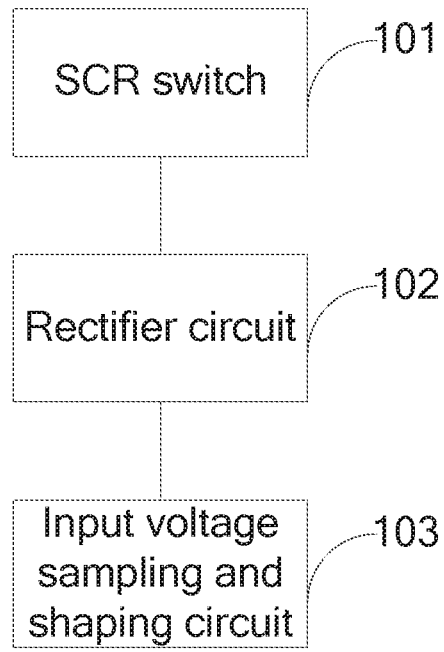
FIG. 5 is a structural block diagram of a device of generating stable direct current signal according to a third embodiment of the present application.

As shown in FIG. 5, a device of generating stable direct current signal is provided, comprising:

a SCR switch 101, connected to mains supply, for outputting an alternating current signal related to a phase angle of the SCR switch 101;

a rectifier circuit 102, connected to the SCR switch 101, for rectifying the alternating current signal;

an input voltage sampling and shaping circuit 103, connected to the rectifier circuit 102, for converting rectified alternating current signal into a stable direct current signal one-to-one corresponding to the phase angle of the SCR switch 101, wherein the stable direct current signal decreases as the phase angle of the SCR switch 101 increases.

The device of generating stable direct current signal of the present application can generate a stable direct current signal one-to-one corresponding to the phase angle of the SCR switch 101.

Embodiment 4

The present embodiment has provided a dimming device of a SCR switch which corresponding to the method according to the second embodiment.

The dimming device of a SCR switch is connected to a plurality of serially connected LED lamp groups 100, which comprises one LED lamp or a plurality of LED lamps connected in parallel.

Figure 6:
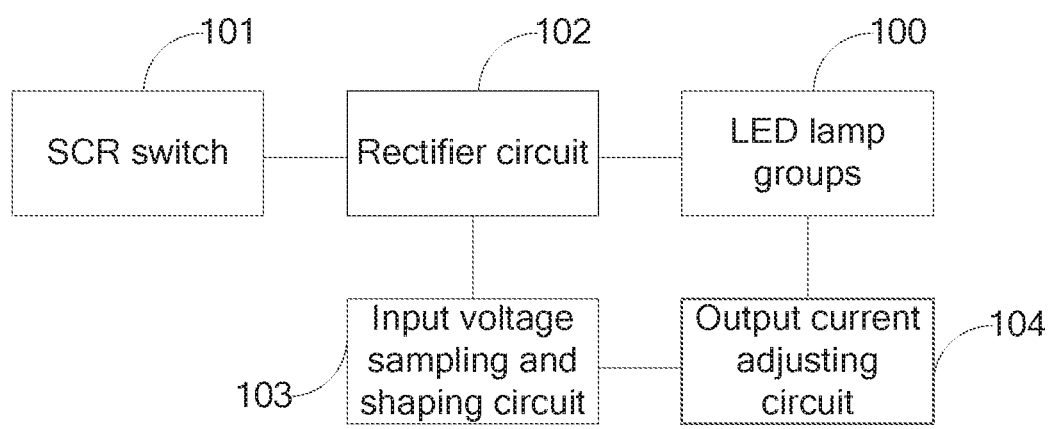
FIG. 6 is a structural block diagram of a dimming device of a SCR switch according to a fourth embodiment of the present application.

As shown in FIG. 6, the dimming device of a SCR switch comprises:

a SCR switch 101, connected to mains supply, for outputting an alternating current signal related to a phase angle of the SCR switch 101;

a rectifier circuit 102, connected to the SCR switch 101, for rectifying the alternating current signal;

an input voltage sampling and shaping circuit 103, connected to the rectifier circuit 102, for converting rectified alternating current signal into a stable direct current signal one-to-one corresponding to the phase angle of the SCR switch 101, wherein the stable direct current signal decreases as the phase angle of the SCR switch 101 increases;

an output current adjusting circuit 104, connected to the input voltage sampling and shaping circuit 103, for being turning on or off according to a magnitude of the stable direct current signal for outputting a current changing with the magnitude of the stable direct current signal, thus turning all on or all off the plurality of serially connected LED lamp groups 100 by controlling an output current for the plurality of serially connected LED lamp groups 100.

Figure 7:
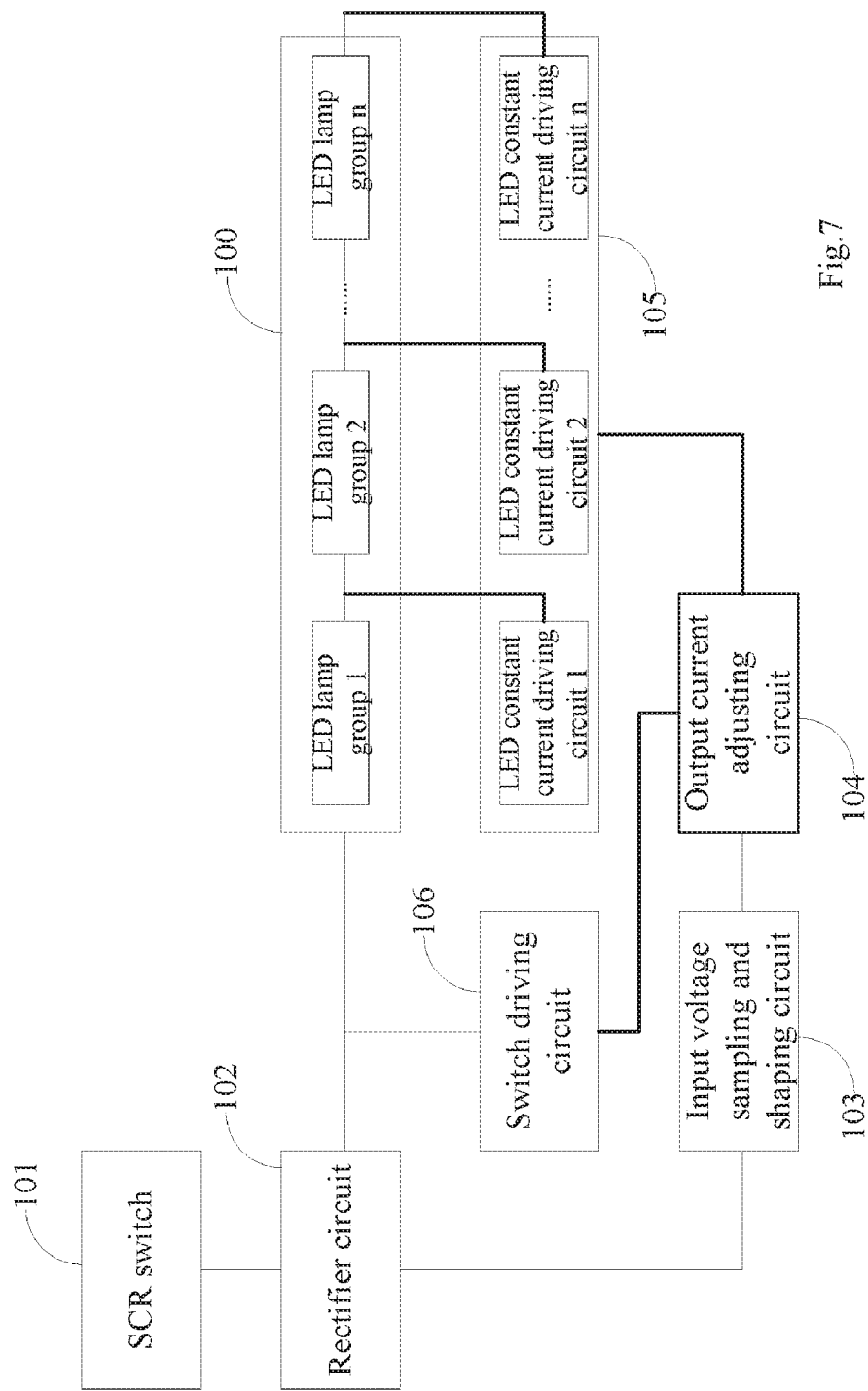
FIG. 7 is a structural block diagram of a preferable dimming device of a SCR switch according to the fourth embodiment of the present application.

As a preferable implementation of the present embodiment, as shown in FIG. 7, the dimming device of a SCR switch further comprises:

a multi-level LED constant current driving circuit 105, connected to the output current adjusting circuit 104 and one-to-one connected to the plurality of LED lamp groups 100, for driving the plurality of LED lamp groups 100; wherein a number of the multi-level LED constant current driving circuit 105 is same as that of the plurality of LED lamp groups 100;

a switch driving circuit 106, connected to an input terminal of a first LED lamp group and an output terminal of the output current adjusting circuit 104, for generating a holding current of the SCR switch 101 to enable a normal operation of the SCR switch 101 when the plurality of LED lamp groups 100 are turned off.

Preferably, each level of the multi-level LED constant current driving circuit 105 comprises a current input terminal, a reference voltage terminal and a current output terminal. The output current adjusting circuit 104 comprises a switch tube comprising an input terminal, an output terminal and a control terminal.

The current input terminal of each level of the multi-level LED constant current driving circuit 105 is one-to-one correspondingly connected to an output terminal of each LED lamp group, and the current output terminal of each level of the multi-level LED constant current driving circuit 105 is connected together to the output terminal of the switch tube; wherein, the control terminal of the switch tube is connected to the input voltage sampling and shaping circuit, and the output terminal of the switch tube is connected to the switch driving circuit 106.

Figure 8:
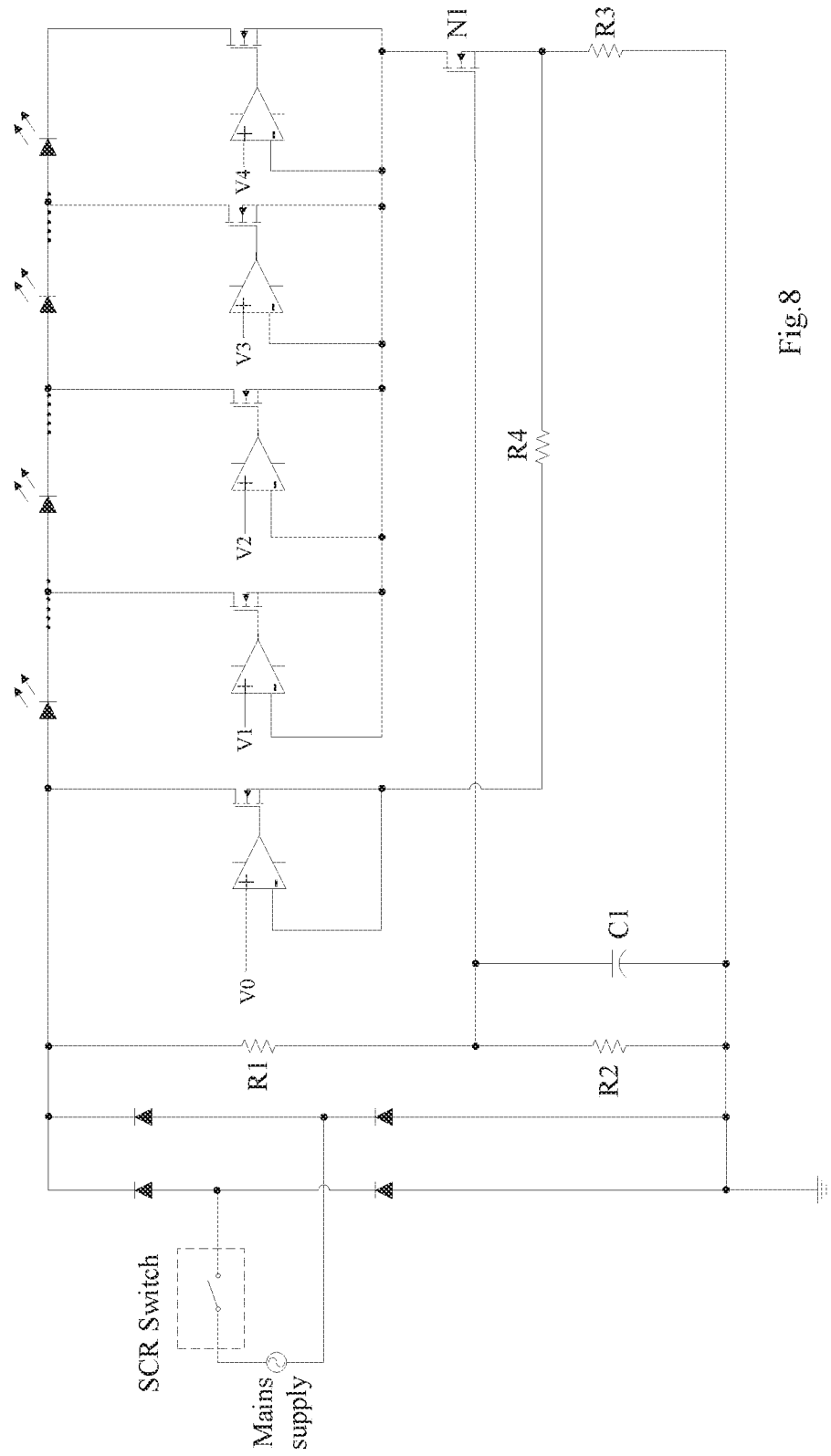
FIG. 8 is a circuit diagram of the dimming device of a SCR switch according to the fourth embodiment of the present application.

FIG. 8 is a circuit diagram of the dimming device of a SCR switch, in which the first N-channel MOS transistor N1 having a drain as the input terminal, a source as the output terminal, and a gate as the control terminal forms the output current adjusting circuit 104.

The input voltage sampling and shaping circuit 103 comprises a resistor R1, a resistor R2 and a capacitor C1, wherein a first terminal of the resistor R1 is connected to a first terminal of the resistor R2, a first terminal of the capacitor C1 and the control terminal of the switch tube; and the second terminal of the resistor R2 and the second terminal of the capacitor C1 are connected to a reference ground.

Each level of the multi-level LED constant current driving circuit comprises an operational amplifier and an N-channel MOS tube. As shown in FIG. 5, there are four levels of LED constant current driving circuit and four LED lamp groups. A non-inverting input terminal of the operational amplifier in each lever of LED constant current driving circuit forms the reference voltage terminal of this level of the LED constant current driving circuit, the inverting input terminal of the operational amplifier and a source of the N-channel MOS tube of each lever of the multi-level LED constant current driving circuit 105 are connected together to form the current output terminal of this level of the multi-level LED constant current driving circuit 105. The drain of the first N-channel MOS transistor N1 is connected to the current output terminal. A drain of the N-channel MOS tube of each lever of the multi-level LED constant current driving circuit 105 forms the current input terminal of this level of the multi-level LED constant current driving circuit 105 and is connected to the output terminal of the corresponding LED lamp group. An output terminal of the operational amplifier of each lever of the multi-level LED constant current driving circuit 105 is connected with a gate of the N-channel MOS tube of this level of the multi-level LED constant current driving circuit.

The switch driving circuit 106 comprises an operational amplifier, an N-channel MOS tube, a resistor R3, and a resistor R4; wherein an non-inverting input terminal of the operational amplifier forms a reference voltage terminal of the switch driving circuit, an output terminal of the operational amplifier is connected to the gate of the N-channel MOS tube whose drain is connected to an input terminal of a first LED lamp group, an inverting input terminal of the operational amplifier and the source of the N-channel MOS tube are together connected to a first terminal of the resistor R4 whose second terminal is connected to the source of the first N-channel MOS transistor N1 and a first terminal of the resistor R3 whose second terminal is connected to the reference ground.

The operating principle of the present circuit is described as follows.

The switch driving circuit 106 generates a holding current of the SCR switch 101 to enable a normal operation of the SCR switch 101 when the four LED lamp groups are turned off. The generated holding current is V0/(R3+R4). The first-four levels of the LED constant current driving circuit respectively control the output currents of the four LED lamp groups of V1/(R3+$R_{N1}$), V2/(R3+$R_{N1}$), V3/(R3+$R_{N1}$), V4/(R3+$R_{N1}$); wherein the $R_{N1}$ represents the on-resistance of the first N-channel MOS transistor N1, and V0<V1<V2<V3<V4.

When the SCR diming is not implemented or the phase angle of the SCR switch 101 is small, the stable direct current signal has a voltage large enough to turn all the four LED lamp groups on. Moreover, the input voltage sampling and shaping circuit 103 has a high output voltage, so the voltage Vgs between the gate and source of the first N-channel MOS transistor N1 is very large. Accordingly, the first N-channel MOS transistor N1 operates at the deep linear region, so its on-resistance $R_{N1}$ is small and the voltage Vds between drain and source is small, too. The output current of the four LED lamp groups can be approximately equal to V1/R3, V2/R3, V3/R3, and V4/R3.

Figure 9:
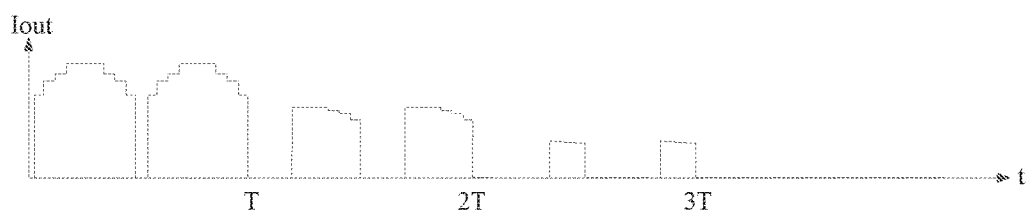
FIG. 9 is a current signal waveform diagram which changes with the phase angle of the SCR switch and outputted by the plurality of LED lamp groups according to the fourth embodiment of the present application.

As shown in FIG. 2, when the phase angle of the SCR switch 101 is adjusted to increase from a smaller value to a larger value but be still smaller than or equal to a threshold value, the stable direct current signal outputted by the input voltage sampling and shaping circuit 103 decrease from a larger value to a smaller value. As shown in FIG. 3, the voltage between the gate and the source of the first N-channel MOS transistor N1 decreases from a larger value to a smaller value which is still larger than or equal to a turning-on threshold value of the first N-channel MOS transistor N1, the first N-channel MOS transistor N1 is turned on to operate in an operation state moving from the deep linear region to the saturation region in which the on-resistance $R_{N1}$ gradually increases, and the output current thereof decreases. Therefore, the output current of the four LED lamp groups (Iout) decrease. As shown in FIG. 9, the forward conductive voltage of the four LED lamp groups decreases, and meanwhile a voltage difference between an input terminal of the first LED lamp group and an output terminal of a last LED lamp group is equal to or larger than a sum of forward conductive voltages of all the LED lamp groups, then the four LED lamp groups keep the turning on state when the output voltage of the SCR switch 101 is small. The LED lamp groups are all turned on with a brightness decreasing with the increasing of the phase angle of the SCR switch 101.

When the phase angle of the SCR switch 101 increases to be larger than the threshold value, the stable direct current signal outputted by the input voltage sampling and shaping circuit 103 becomes very small, which enable the voltage Vgs between the gate and the source of the first N-channel MOS transistor N1 to be smaller than the turning-on threshold value of the first N-channel MOS transistor N1, such that the first N-channel MOS transistor N1 as well as the plurality of serially connected LED lamp groups 100 are turned all off.

The threshold is related to the ratio of the resistor 1 and the resistor R2, and can be adjusted according to the ratio. The threshold is preferably 70%~80% of the maximum value of the phase angle of the SCR switch 101. The turning on threshold voltage of the first N-channel MOS transistor N1 can be different depending on different manufacturing processes, and in the present application, it is preferably 0.7V to 1V.

The dimming device of a SCR switch of the present embodiment can generate a stable direct current signal which is one-to-one corresponding to the phase angle of the SCR switch. Such stable direct current signal can he applied for controlling the turning on or off of the output current adjusting circuit of the dimming device of a SCR switch, thus controlling the plurality of LED lamp groups connected in series to be turned all on or all off for avoiding the problem that the brightness of the LED lamps is not uniform enough and increasing the visual effect.

As mentioned above, only the better specific implementation of this application is provided, but the protection scope of this application is not limited to this. Any change or replacement that can easily be thought of by one familiar with the technical field disclosed in this application shall be covered in the protection scope of this application. Therefore, the protection scope of this application shall be subject to the protection scope of the claims.

What claimed is:

1. A dimming method of a SCR switch, applicable to a dimming device of a SCR switch comprising an output current adjusting circuit connected to a plurality of serially connected LED lamp groups, comprising following steps:

adjusting a phase angle of a SCR switch and outputting an alternating current signal related to the phase angle of the SCR switch;

rectifying the alternating current signal;

converting the rectified alternating current signal into a stable direct current signal corresponding to the phase angle of the SCR switch, wherein the stable direct current signal decreases as the phase angle of the SCR switch increases, wherein each one stable direct current signal is corresponding to one phase angle;

controlling the output current adjusting circuit to be turned on or off according to a magnitude of the stable direct current signal for outputting a current changing with the magnitude of the stable direct current signal by the output current adjusting circuit, thus turning all on or all off the plurality of serially connected LED lamp groups by controlling an output current of the plurality of serially connected LED lamp groups;

wherein the output current adjusting circuit comprises an N-channel MOS transistor; and the step of controlling the output current adjusting circuit to be turned on or off according to a magnitude of the stable direct current signal for outputting a current changing with the magnitude of the stable direct current signal by the output current adjusting circuit, thus turning all on or all off the plurality of serially connected LED lamp groups by controlling an output current for the plurality of serially connected LED lamp groups further comprising following steps:

controlling a voltage between a gate and a source of the N-channel MOS transistor to decrease but still be larger than or equal to a turning-on threshold value of the N-channel MOS transistor for turning on the N-channel MOS transistor, when the phase angle of the SCR switch increases but is still smaller than or equal to a threshold value to decrease the stable direct current signal; such that an on-resistance of the N-channel MOS transistor increases and an output current of the N-channel MOS transistor decreases which decreasing an output current and a forward conductive voltage of the plurality of serially connected LED lamp groups, and meanwhile a voltage difference between an input terminal of a first LED lamp group and an output terminal of a last LED lamp group is equal to or larger than a sum of forward conductive voltages of all the LED lamp groups, then the plurality of serially connected LED lamp groups are turned all on with a decreasing brightness;

controlling the voltage between the gate and the source of the N-channel MOS transistor to decrease to be smaller than the turning-on threshold value of the N-channel MOS transistor for turning off the N-channel MOS transistor, when the phase angle of the SCR switch increases to be larger than the threshold value; such that the plurality of serially connected LED lamp groups are turned all off.

2. A dimming device of a SCR switch connected to a plurality of serially connected LED lamp groups, comprising:

a SCR switch, connected to mains supply, for outputting an alternating current signal related to a phase angle of the SCR switch;

a rectifier circuit, connected to the SCR switch, for rectifying the alternating current signal;

an input voltage sampling and shaping circuit, connected to the rectifier circuit, for converting the rectified alternating current signal into a stable direct current signal corresponding to the phase angle of the SCR switch, wherein the stable direct current signal decreases as the phase angle of the SCR switch increases, wherein each one stable direct current signal is corresponding to one phase angle;

an output current adjusting circuit, connected to the input voltage sampling and shaping circuit, for being turning on or off according to a magnitude of the stable direct current signal for outputting a current changing with the magnitude of the stable direct current signal, thus turning all on or all off the plurality of serially connected LED lamp groups by controlling an output current for the plurality of serially connected LED lamp groups;

a multi-level LED constant current driving circuit, connected to the output current adjusting circuit and connected to the plurality of LED lamp groups, for driving the plurality of LED lamp groups; wherein a number of the LED constant current driving circuit is same as that of the plurality of LED lamp groups, wherein each one multi-level LED constant current driving circuit is connected one LED lamp group;

a switch driving circuit, connected to an input terminal of a first LED lamp group and an output terminal of the output current adjusting circuit, for generating a holding current of the SCR switch to enable a normal operation of the SCR switch when the plurality of LED lamp groups are turned off.

3. The dimming device of a SCR switch according to claim 2, wherein each level of the multi-level LED constant current driving circuit comprises a current input terminal, a reference voltage terminal and a current output terminal; wherein the output current adjusting circuit comprises a switch tube comprising an input terminal, an output terminal and a control terminal;

wherein each of the current input terminal of each level of the multi-level LED constant current driving circuit is correspondingly connected to each output terminal of each LED lamp group, and the current output terminals of each level of the multi-level LED constant current driving circuit are connected together to the output terminal of the switch tube; wherein, the control terminal of the switch tube is connected to the input voltage sampling and shaping circuit, and the output terminal of the switch tube is connected to the switch driving circuit.

4. The dimming device of a SCR switch according to claim 3, wherein the switch tube is a first N-channel MOS transistor having a drain as the input terminal of the switch tube, a source as the output terminal of the switch tube, and a gate as the control terminal of the switch tube.

5. The dimming device of a SCR switch according to claim 3, wherein the input voltage sampling and shaping circuit comprises a resistor R1, a resistor R2 and a capacitor C1; wherein a first terminal of the resistor R1 is connected to a first terminal of the resistor R2, a first terminal of the capacitor C1 and the control terminal of the switch tube; and the second terminal of the resistor R2 and the second terminal of the capacitor C1 are connected to a reference ground.

6. The dimming device of a SCR switch according to claim 3, wherein each level of the multi-level LED constant current driving circuit comprises an operational amplifier and an N-channel MOS tube; wherein an non-inverting input terminal of the operational amplifier forms the reference voltage terminal of this level of the multi-level LED constant current driving circuit, an inverting input terminal of the operational amplifier and a source of the N-channel MOS tube of each lever of the multi-level LED constant current driving circuit are connected together to form the current output terminal of this level of the multi-level LED constant current driving circuit; wherein a drain of the N-channel MOS tube of each lever of the multi-level LED constant current driving circuit forms the current input terminal of this level of the multi-level LED constant current driving circuit; wherein an output terminal of the operational amplifier of each lever of the multi-level LED constant current driving circuit is connected with a gate of the N-channel MOS tube of this level of the multi-level LED constant current driving circuit.

7. The dimming device of a SCR switch according to claim 3, wherein the switch driving circuit comprises an operational amplifier, an N-channel MOS tube, a resistor R3, and a resistor R4; wherein an non-inverting input terminal of the operational amplifier forms a reference voltage terminal of the switch driving circuit, an output terminal of the operational amplifier is connected to the gate of the N-channel MOS tube whose drain is connected to an input terminal of a first LED lamp group, an inverting input terminal of the operational amplifier and the source of the N-channel MOS tube are together connected to a first terminal of the resistor R4 whose second terminal is connected to an output terminal of the switch tube and a first terminal of the resistor R3 whose second terminal is connected to the reference ground.

8. The dimming device of a SCR switch according to claim 3, wherein a voltage between a gate and a source of the N-channel MOS transistor is controlled to decrease but still be larger than or equal to a turning-on threshold value of the N-channel MOS transistor for turning on the N-channel MOS transistor, when the phase angle of the SCR switch increases but is still smaller than or equal to a threshold value to decrease the stable direct current signal; such that an on-resistance of the N-channel MOS transistor increases and an output current of the N-channel MOS transistor decreases which decreasing an output current and a forward conductive voltage of the plurality of serially connected LED lamp groups, and meanwhile a voltage difference between an input terminal of a first LED lamp group and an output terminal of a last LED lamp group is equal to or larger than a sum of forward conductive voltages of all the LED lamp groups, then the plurality of serially connected LED lamp groups are turned all on with a decreasing brightness;

wherein the voltage between the gate and the source of the N-channel MOS transistor to is controlled to decrease to be smaller than the turning-on threshold value of the N-channel MOS transistor for turning off the N-channel MOS transistor, when the phase angle of the SCR switch increases to be larger than the threshold value; such that the plurality of serially connected LED lamp groups are turned all off.

* * * * *